United States Patent [19]

Buck

[11] 3,898,512

[45] Aug. 5, 1975

[54] PHOTOFLASH LAMP ARRAY SEQUENCING CIRCUITS

[75] Inventor: Robert J. Buck, Dover, N.J.

[73] Assignee: Berkey Photo, Inc., Paramus, N.J.

[22] Filed: Mar. 8, 1974

[21] Appl. No.: 449,280

[52] U.S. Cl. .................. 315/89; 315/130; 315/153; 315/159; 315/241 P; 354/33; 354/143; 431/95

[51] Int. Cl. ......................... F21k 5/02; H05b 43/02

[58] Field of Search ........... 315/153, 156, 158, 159, 315/240, 241 P, 89, 130, 136; 431/95; 354/143, 33; 240/1.3

[56] References Cited

UNITED STATES PATENTS

| | | | |
|---|---|---|---|
| 3,518,487 | 6/1970 | Tanaka et al. | 354/143 X |
| 3,676,045 | 7/1972 | Watrous et al. | 431/95 |
| 3,787,167 | 1/1974 | Watrous | 315/241 P X |

*Primary Examiner*—Siegfried H. Grimm
*Attorney, Agent, or Firm*—Neuman, Williams, Anderson & Olson

[57] ABSTRACT

Circuits for sequentially actuating a plurality of photoflash lamps upon successive operations of the shutter of an associated camera are disclosed utilizing gate controlled switching devices coupled in series with the photoflash lamps across a capacitor, the capacitor supplying the current required to flash the lamps. A light emitting diode is included which provides the camera operator a visual indication when the last lamp has been fired. Circuitry is also provided for defeating operation of the sequencing circuit when the ambient light level is sufficiently high that no photoflash is required for the taking of a photograph.

15 Claims, 2 Drawing Figures

PHOTOFLASH LAMP ARRAY SEQUENCING CIRCUITS

BACKGROUND OF THE INVENTION

This invention relates to apparatus for sequentially firing individual photoflash lamps in an array of two or more such lamps and, in particular, relates to such sequential firing circuits which may advantageously be constructed using integrated circuit techniques. The invention finds particular use in sequentially firing the individual lamps of photoflash lamp arrays packaged in disposable containers which may easily be plugged into an associated camera.

A number of different apparatus have been proposed in the past for sequentially firing individual photoflash lamps in an array of such lamps. Such apparatus are shown, for example, in U.S. Pat. Nos. 3,532,931 to Cote, et al., 3,618,492 to Ellin, 3,668,468 to Kornrumpf, et al., 3,676,045 to Watrous, et al., 3,699,861 to Burgarella, et al., 3,714,508 to Harnden, et al., and 3,728,947 to Harnden, et al. Each of the last six mentioned patents shows sequencing circuitry powered by a battery wherein each lamp is coupled in series with a gate controlled semiconductor switching means and the series combination is coupled directly across the supply battery. The use of gate controlled switching means has proven very advantageous in constructing circuits to have the desired circuit functions. However, this arrangement is characterized by one particular disadvantage. Photoflash lamps occasionally are manufactured defectively so that they exhibit a short circuit or very low impedance between their terminals. Further, the filaments of photoflash lamps occasionally are consumed during the flashing thereof such that short circuit or very low impedance path is created between the terminals of the lamp. In any case, if a lamp is in a short circuit condition, when the associated switching means is conductive it is essentially placed directly across the supply battery causing a relatively large current to flow through it. That large current may cause permanent damage to the switching means and, if the switching means is included as a part of an integrated circuit, may cause permanent damage to and completely disable the entire integrated circuit. The large current may also cause excessive battery drain. One solution to this problem has been to construct the switching means to have sufficient current carrying capacity to handle the excess current imposed by the short circuit condition. This does not solve the battery drain problem. A second solution has been to include a current limiting circuit to limit current flow from the supply battery to the switching means to a selected value above that normally required to flash a single lamp and a thermally responsive circuit which terminates the flow of current to the sequencing circuit when its components reach an excessively high temperature. However, both these solutions add undesirable expense to the sequencing circuit. The circuitry of the first above-mentioned patent includes voltage and current breakdown devices for sequentially firing photoflash lamps through the use of a capacitive discharge and circuitry for limiting the current flow from the supply battery to the breakdown devices to a value below that normally required to flash a single lamp, but does not have the versatility of circuits using gate controlled switching means to control the flashing of individual lamps. The circuitry of the second above-mentioned patent uses transistors as the switching means in series with the photoflash lamps and includes separate circuitry for detecting the flow of excessive current, indicating a shorted lamp, and disabling the flow of current through the switching transistors in response thereto. This arrangement also adds undesirable expense to the sequencing circuit. The last above-mentioned patent suggests the use of fuse elements in series with each photoflash lamp. The fuses, of course, represent an undesirable expense.

The sequencing circuits of the prior art have also had other disadvantages associated therewith. They have not given the camera operator any signal or warning that the last lamp in the array has previously been flashed. The only way in which the camera operator could determine whether there were any unused lamps remaining in the array was to either mentally count the lamps as they were fired or to examine each lamp and determine from its physical appearance whether it had previously been fired. This procedure has proven to be a great inconvenience. It is particularly inconvenient where a series of photographs is being taken in relatively rapid succession. On such occasions, the photographer often merely takes a series of pictures until he finally takes a picture and no light flash occurs. By the absence of the flash, he knows that all the lamps of the array then in use have been fired, but a frame of film has been wasted.

Photoflash lamp array sequencing circuits of the prior art have also not included means for defeating the operation of the sequencing circuit so that no lamp will be fired when there is sufficient light from other sources that no photoflash is required. The only means by which a photographer could prevent firing of a flash lamp was to remove or disconnect the array from the camera before taking a photograph. This was an especially noteworthy inconvenience when one was taking a series of photographs under varying ambient light conditions even within the same room. Further, the determination of whether a photoflash is required in the taking of a particular photograph is one which requires a degree of judgment which many photographers, particularly amatueur photographers, cannot correctly exercise. Thus it is desirable to include in photoflash sequencing circuitry means for preventing the creation of a photoflash which operates automatically and independently of intervention by the photographer. The above-mentioned U.S. Pat. No. 3,728,947 purports to show circuitry for flashing one or more lamps in an array until the light reflected by the subject being photographed achieves a predetermined value. However, the circuitry there shown is excessively complex and expensive and is not effective to completely disable the sequencing circuit when no photoflash is required.

SUMMARY OF THE INVENTION

There are provided by this invention photoflash lamp array sequencing circuits using a gate controlled switching means in series with each individual photoflash lamp and coupled across a capacitor which supplies the current required to fire the photoflash lamps. Current limiting means are disposed between the capacitor and a source of capacitor charging current to limit the current flow directly from the current source to the photoflash lamps to a value below that required to fire the flash lamps. Some embodiments of this invention include circuitry for preventing the firing of a flash lamp when the ambient light level is sufficiently high that no photoflash is required for the taking of a photograph. Other embodiments of this invention include circuitry for indicating to the camera operator that all the photoflash lamps of the array have been used.

It is, thus, an object of this invention to provide a photoflash lamp array sequencing circuit using gate controlled switching means to control the firing of individual photoflash lamps wherein the current flow directly from a power source to the switching means is limited to a magnitude below that required to fire a photoflash lamp.

It is an object of this invention to provide a photoflash lamp array sequencing circuit using gate controlled switching means to control the firing of individual photoflash lamps wherein the current for firing the photoflash lamps is supplied from a capacitor.

It is an object of this invention to provide a photoflash lamp array sequencing circuit using gate controlled switching means to control the firing of individual photoflash lamps wherein the current flow from the power source to the sequencing circuit is limited to a magnitude below that required to fire a photoflash lamp.

It is an object of this invention to provide a photoflash lamp array sequencing circuit using gate controlled switching means to control the firing of individual photoflash lamps wherein the power dissipated in the circuit in the event of a short circuited or low impedance lamp is limited to a relatively low magnitude.

It is an object of this invention to provide a photoflash lamp array sequencing circuit using gate controlled switching means to control the firing of individual photoflash lamps wherein the power dissipated in the switching means in the event of a short circuited or low impedance lamp is limited to a relatively low magnitude.

It is an object of this invention to provide a photoflash lamp array sequencing circuit including means for indicating to the camera operator that all the lamps of the array have been used.

It is an object of this invention to provide a photoflash lamp array sequencing circuit including means for indicating to the camera operator that the last lamp in the firing sequence has been used.

It is an object of this invention to provide a photoflash lamp array sequencing circuit including means for preventing the firing of a photoflash lamp when the ambient light is sufficiently high that no photoflash is required for the taking of a photograph.

It is an object of this invention to provide a photoflash lamp array sequencing circuit wherein the current for firing the photoflash lamps is supplied from a capacitor and including means for preventing the charging of said capacitor when the ambient light is sufficiently high that no photoflash is required for the taking of a photograph.

It is an object of this invention to provide a photoflash lamp sequencing circuit which fulfills each of the above-mentioned objects and is further characterized by simplicity of design, economy of construction, reliability in operation, and ease of use.

Further and additional objects of this invention will be apparent from this specification and appended claims and the drawing.

DESCRIPTION OF THE PREFERRED EMBODIMENTS

The subject matter of this invention will now be described with reference to the photoflash lamp array sequencing circuits disclosed in FIGS. 1 and 2 of the accompanying drawings. While the invention is described with reference to only certain embodiments thereof, it will be apparent to those skilled in the art that it is of much broader application and may take many forms other than the embodiments here specifically disclosed.

Figure 1:
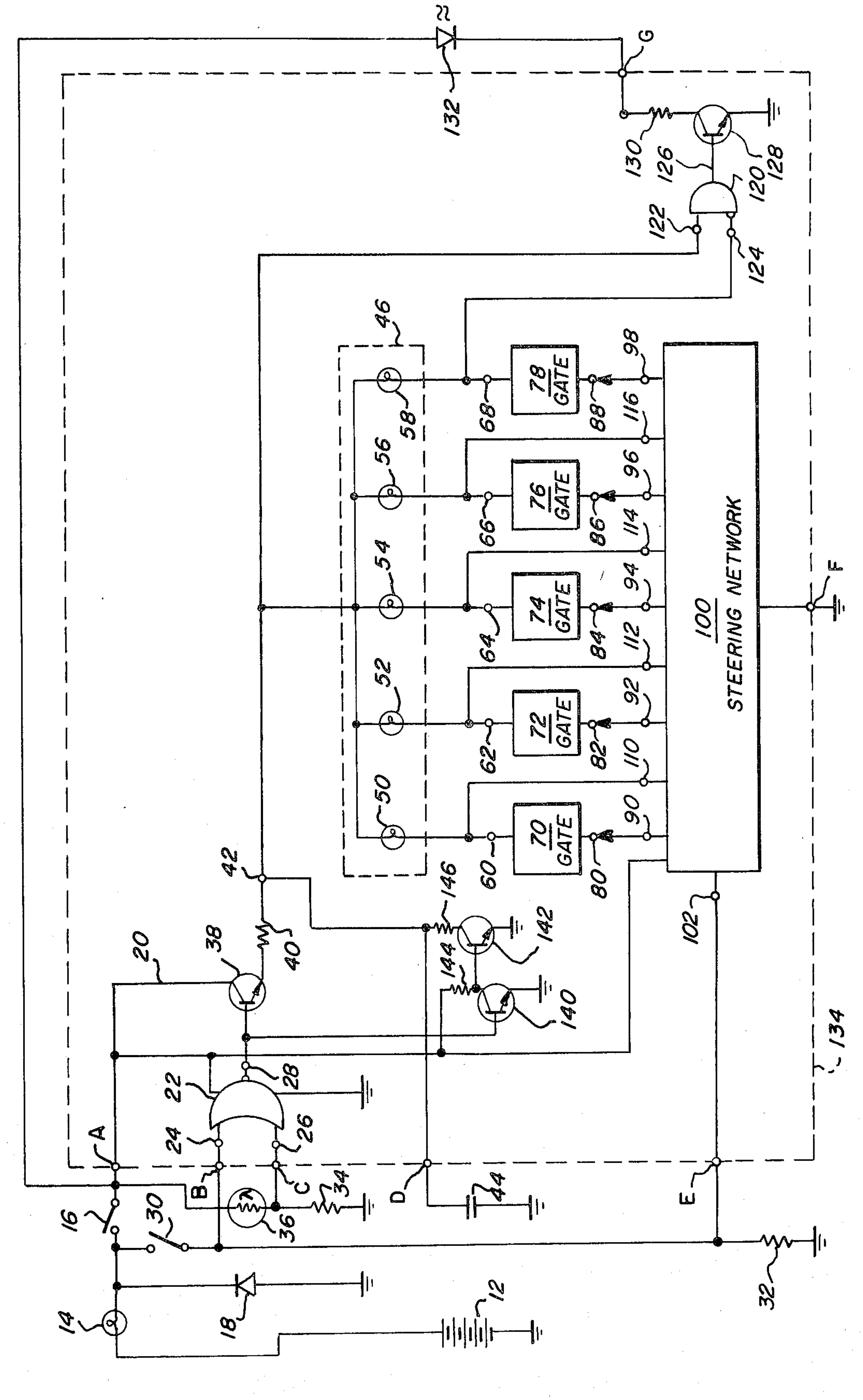
FIG. 1 is a drawing partly in block form and partly in schematic form of a photoflash lamp array sequencing circuit of this invention.
Figure 2:
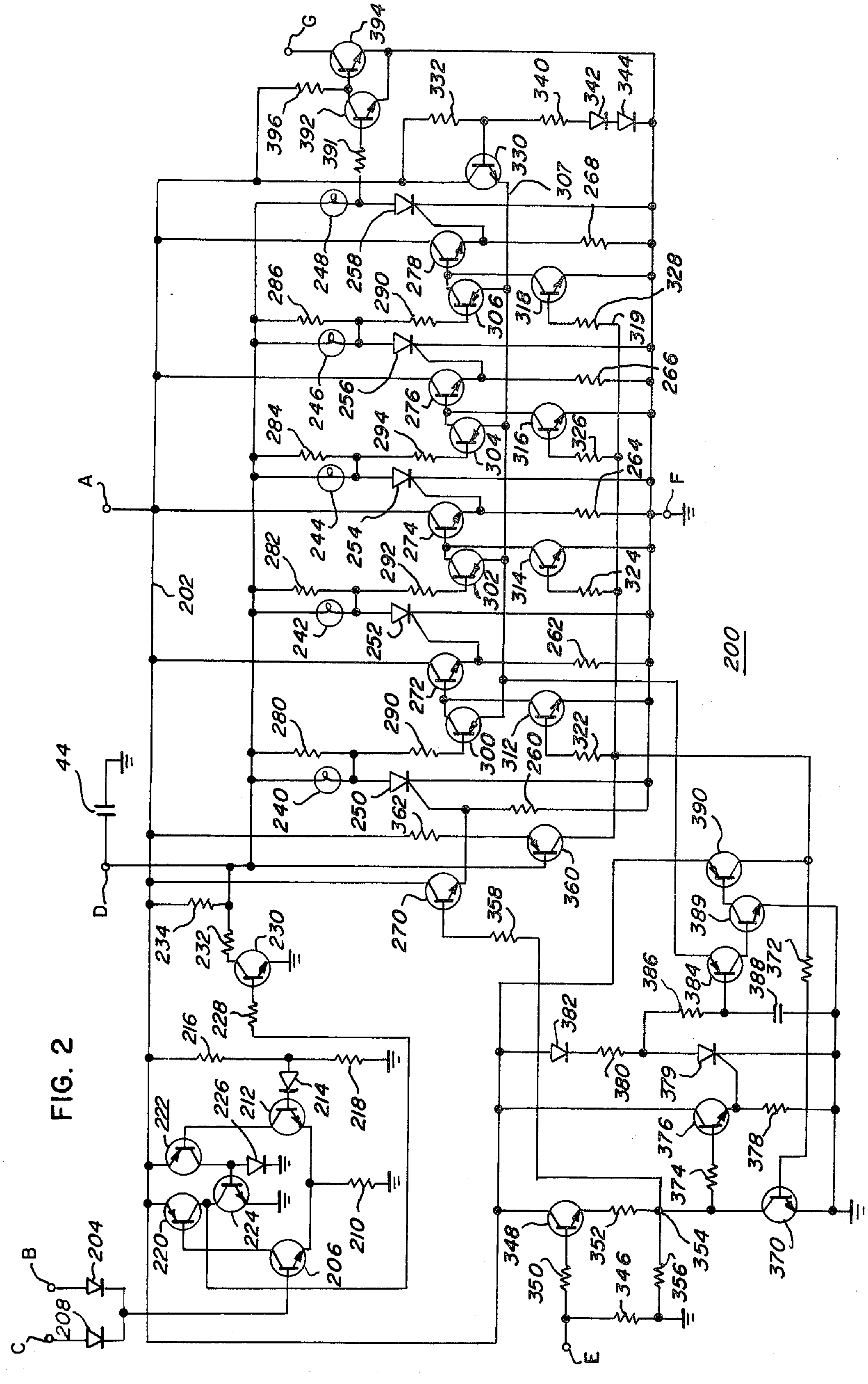
FIG. 2 is a drawing in schematic form of a photoflash lamp array sequencing circuit of this invention.

The embodiments of FIGS. 1 and 2 hereof are intended to operate with the sets of multiple photoflash lamps manufactured by the General Electric Company, Nela Park, Cleveland, Ohio and sold under the term "FlashBar." In brief, those sets each comprise two arrays of five separate photoflash lamps. Each separate lamp is comprised of a filament disposed within a transparent, gas filled bulb and connected between two lamp terminals. The filament initially has a relatively low electrical impedance. The lamp is fired by passing a relatively high magnitude electric current through the filament causing it to vaporize and emit a bright flash of light. After the lamp is fired, a relatively very high impedance normally exists between its terminals. The lamps of each array are physically disposed along one side of the device. One terminal of each of the five lamps is connected to one terminal of each of the other lamps to form a common terminal for that array. The common terminal and the remaining terminal of each lamp of the array are each electrically coupled to a respective electrically conductive means on a connector means. The connector means provides means for applying electrical currents to the separate photoflash lamps as well as means for securing the array to the camera with which it is to be used. As the construction and function of the said General Electric photoflash lamp set is well known, it will not be discussed here in further detail.

The photoflash lamp array sequencing circuit of FIG. 1 is included within an associated camera, not shown. It includes a battery 12 having its negative terminal connected to a circuit ground and its positve terminal connected through a lamp 14 to a first terminal of a normally open single pole, single throw switch 16. Switch 16 is a part of the shutter cocking mechanism of the associated camera; it is closed when the shutter is cocked and opened after the shutter is actuated and returns to the closed position. The first terminal of switch 16 is coupled to ground through a diode 18, diode 18 being oriented for relatively high positive conductivity away from ground. A second terminal of switch 16 is coupled to a positive voltage supply bus 20 of the sequencing circuit. Diode 18 prevents damage to other components of the circuit in the event the polarity of battery 12 should be inadvertently reversed. Lamp 14 provides a visual signal to the operator that switch 16 has been closed and the associated camera is ready to take a picture; it may conveniently be located inside the camera viewfinder.

The sequencing circuit further includes an electrical NOR gate 22 having a first input terminal 24, a second input terminal 26, and an output terminal 28. The NOR gate 22 is coupled to supply bus 20 and ground to supply power thereto. It is such that its output terminal is at approximately the potential of supply bus 20 when signals of positive potential less than a predetermined value are applied to both input terminals 24 and 26 simultaneously and its output terminal is at approximately 0 volts with respect to ground at all other times. The first input 24 of NOR gate 22 is coupled to a first terminal of a normally open single pole single throw switch 30. Switch 30 is a part of the shutter mechanism of the camera associated with the sequencing circuit and is closed in timed relationship with the opening of the shutter. It may comprise a portion of the switch for actuating the shutter of the associated camera. The first terminal of switch 30 is also coupled through a resistor 32 to ground. A second terminal of switch 30 is coupled to the first terminal of switch 16. The second input terminal 26 of NOR gate 22 is coupled both through a resistor 34 to ground and through a light dependent resistor 36 to the positive supply bus 20. Light dependent resistor 36 is physically located closely adjacent the lens of the camera with which the sequencing circuit is associated so that the brightness of the light falling on light dependent resistor 36 is approximately the same as the light received by the camera lens. The output terminal 28 of gate 22 is coupled to the base of an NPN transistor 38. The collector thereof is coupled to the positive supply bus 20 and the emitter is coupled through a resistor 40 to a circuit point 42. Circuit point 42 is coupled through a capacitor 44 to ground.

The circuitry of FIG. 1 as thus far described is operative to control the flow of current from positive supply bus 20 to capacitor 44. In order for current to flow from positive supply bus 20 through the collector/emitter circuit of transistor 38 and resistor 40 to capacitor 44, three conditions must be present: switch 16 must be closed; switch 30 must be open; and the level of brightness of the light falling on light dependent resistor 36 must be relatively low. If the level of brightness of the light falling on light dependent resistor 36 is relatively high, thus indicating that no photoflash is required to take a photograph, or switch 30 is closed, no forward bias is applied to the base/emitter junction of transistor 38 so that the emitter/collector circuit thereof is not conductive and capacitor 44 is not charged by the flow of current thereto from positive supply bus 20. Switch 16 must be closed in order for power to be applied to positive supply bus 20.

Capacitor 44 is used as the source of current for firing the photoflash lamps. The common terminal of a photoflash lamp array 46 is coupled to circuit point 42. The subarray includes five photoflash lamps 50, 52, 54, 56, and 58. The remaining terminals of the five photoflash lamps are individually coupled to first terminals 60, 62, 64, 66, and 68 of gate controlled switching elements 70, 72, 74, 76, and 78, respectively. Each of the gate controlled switching elements has a control or gate input 80, 82, 84, 86, and 88, respectively, and a connection to circuit ground, not shown. Each switching element is such that when an enabling signal is applied to its gate input, sufficient positive current is permitted to flow from capacitor 44 to circuit ground through the associated photoflash lamp to fire the lamp. Prior to the application of an enabling signal, no such current is permitted to flow. Each gate controlled switching element may advantageously include a semiconductor thyristor device having a latching characteristic, such as, for example, a silicon controlled rectifier, or may also comprise one or more transistors.

The gate inputs 80, 82, 84, 86, and 88 of gate controlled switching elements 70, 72, 74, 76, and 78 are each coupled to outputs 90, 92, 94, 96, and 98 of a steering network 100. The steering network is additionally coupled to positive supply bus 20 and circuit ground to apply power thereto. A control input 102 of the steering network 100 is coupled to the first terminal of switch 30. The terminals 60, 62, 64, and 66 of the first four switching elements 70, 72, 74, and 76 are individually coupled to inputs 110, 112, 114, and 116, respectively, of steering network 100. Steering network 100 is such that in the absence of a positive voltage at control input 102, no enabling signals are generated at outputs 90, 92, 94, 96, and 98. However, upon application of a positive voltage pulse to control input 102, an enabling signal for the switching elements is first generated at output terminal 90 and then enabling signals are successively generated at output terminals 92, 94, 96, and 98 in time sequence. The enabling signals thus generated at output terminals 90, 92, 94, 96, and 98 are applied to the gate inputs 80, 82, 84, 86, and 88, respectively, of the gate controlled switching elements. When an enabling signal is applied to the gate input of a switching means associated with a photoflash lamp which has not previously been fired capacitor 44 will discharge through the series combination of the lamp and the switching means firing the photoflash lamp. However, the steering network is also such that the propagation of enabling signals along the outputs 90, 92, 94, and 96 will be terminated at the first output for which a positive voltage is applied to its associated input 110, 112, 114, and 116, respectively, prior to the closure of switch 30. For example, if lamp 50 has not previously been fired, upon charging of capacitor 44 and prior to closure of switch 30 a positive voltage will be applied through lamp 50 to input 110 of the steering network 100. If lamp 50 has previously been fired or is open circuited for some other reason, no such positive voltage pulse will be applied to input 110. In the absence of such a positive voltage at input 110, after closure of switch 30 the enabling signal at output 90 will be propagated to output 92 as previously described. If a positive voltage is present at input 110 prior to the closure of switch 30, the propagation of the enabling signal down the chain of outputs 92, 94, 96, and 98 after the closure of switch 30 will be terminated at output 90 so that no enabling pulses will be generated at outputs 92, 94, 96, and 98 and none of the subsequent lamps 52, 54, 56, or 58 will be fired. Similarly, if either of lamps 52, 54, or 56 has not previously been fired, a positive voltage pulse is applied to input terminals 112, 114, or 116, respectively, thus preventing firing of any subsequent lamps. If the gate controlled switching elements have a latching characteristic, conduction therethrough is terminated upon the opening of swtich 30 and the discharge of the voltage across capacitor 44 to a value below that required to support conduction.

It should be particularly noted that switching elements 70, 72, 74, 76, and 78 normally present a high impedance to current flow therethrough. The only times that high levels of current are permitted to flow through the switching elements occur when the emitter/collector circuit of transistor 38 is nonconductive. The only current which flows through the switching elements results from the discharge of capacitor 44 therethrough. Thus, in the event that one of the flash lamps in the array 46 should have a defect resulting in its presenting a very low impedance or short circuit between its terminals, the only current which would flow through the lamp and its corresponding gate controlled switching element is the discharge current of capacitor 44. The relatively low impedance of the shorted flash bulb would never be placed directly across battery 12. Two particular advantages result from this feature of the invention. First, the battery is protected from excess current drain in the event of a shorted lamp. Second, the sequencing network and the individual gate controlled switching elements are not subject to excessively large current flows therethrough in the event of a shorted lamp. The second advantage is particularly significant when the sequencing circuit is constructed as an integrated circuit. In such instances, excessive current flow through the circuit could create excessive heat and destroy the integrated circuit.

The sequencing circuit also includes a gate 120 having a first input 122 coupled to circuit point 42, a second input 124 coupled to terminal 68 of switching element 78, and an output 126 coupled to the base of an NPN transistor 128. The emitter of that transistor is coupled to ground while the collector thereof is coupled through the series combination of a resistor 130 and a light emitting diode 132 to positive supply bus 20. The light emitting diode is oriented for high positive conductivity away from the positive supply bus 20; it is physically located at a position to make it visible to the camera operator. Gate 120 is such that when a positive voltage signal is applied to input 122 and a signal at approximately ground potential is simultaneously applied to input 124, the output 126 is at a positive potential; otherwise, the output 126 is at approximately ground potential. Thus, gate 120 may comprise an inverter for inverting the signal present at input 124 and a two input AND gate with one input receiving the resulting inverted signal and the other receiving the signal at input 122. The AND gate output is the output 126 of gate 120.

It will be seen that the light emitting diode 132 will be illuminated only when capacitor 44 is charged and flash lamp 58 has been fired or is otherwise open-circuited so that no positive voltage is applied from capacitor 44 through lamp 58 to terminal 68 of gate element 78. Thus, diode 132 is illuminated only when the sequencing circuit is in a condition to fire a flash lamp but the last lamp 58 has been fired or is otherwise open-circuited, indicating that all the lamps in array 46 have been fired and the array should be replaced with a new one.

The circuitry including two NPN transistors 140 and 142 is included in the circuit of FIG. 1 to insure that capacitor 44 is completely discharged after the firing of each lamp 52–58. Transistor 140 has its base coupled to output 28 of gate 22, its emitter coupled to ground, and its collector coupled to supply bus 20 through a resistor 144. Transistor 142 has its base coupled to the collector of transistor 140, its emitter coupled to ground, and its collector coupled to circuit point 42 through a resistor 146. When the output of gate 22 is at a positive voltage prior to the closure of switch 30, the collector/emitter circuit of transistor 142 is nonconductive and capacitor 44 is charged. When the output of gate 22 is at ground level, after the closure of switch 30, the collector/emitter circuit of transistor 142 is conductive and capacitor 44 may discharge to ground through resistor 146. The value of resistor 146 is chosen so that the time constant of the circuit including it and capacitor 44 is relatively long compared to the time required for complete ignition of the flash lamps 50–58. Complete discharge of capacitor 44 is desirable so that no voltage is present on it or the electrical contacts forming the connection between the sequencing circuit and the lamp array after the firing of a lamp. The presence of such a voltage would be particularly disadvantageous upon the removal of an array and reinsertion of a new array as it might cause firing of the lamp in the new array at the position corresponding to the last lamp fired in the removed array. This undesirable voltage on capacitor 44 might result from residual energy caused by one of the lamps 50–58 becoming an open circuit prior to the complete discharge of the capacitor or from what has been termed rebound energy caused by repeated charging and discharging cycles of the capacitor as might occur when a number of lamps were flashed in rapid succession. In the circuit of FIG. 1, it is advantageous to construct all elements within dashed box 134, except array 46, as a single integrated circuit.

There is disclosed in FIG. 2 a circuit 200 for providing the functions of the circuitry included within box 134 of FIG. 1. The circuit points at which the circuitry within box 134 is connected to external components, except for the connections to subarray 46, are indicated by reference letters A–G in FIG. 1. The corresponding circuit points in the circuit of FIG. 2 are indicated by the corresponding reference letters A–G. The circuitry of FIG. 2 will be described with reference to those reference letters.

Circuit point A is coupled to a positive supply bus 202. Circuit point B is coupled through a diode 204 to the base of an NPN transistor 206 and circuit point C is coupled through a diode 208 to the base of that same transistor. Diodes 204 and 208 are oriented for high positive conductivity toward the base of transistor 206. The emitter of transistor 206 is coupled to ground through a resistor 210 and to the emitter of an NPN transistor 212. The base of transistor 212 is coupled through a diode 214 to the junction of two resistors 216 and 218 forming a voltage divider between supply bus 202 and ground. Diode 214 is oriented for high positive conductivity toward the base of transistor 212. The collectors of transistors 206 and 212 are coupled to the bases of PNP transistors 220 and 222, respectively. The emitters of transistors 220 and 222 are coupled to positive supply bus 202. The collector of transistor 222 is coupled both to the base of an NPN transistor 224 and to ground through a diode 226, the diode being oriented for high positive conductivity towards ground. The collectors of transistors 220 and 224 are coupled together, while the emitter of transistor 224 is coupled to ground.

Diodes 204 and 206 perform the logical OR function for positive voltage signals at circuit points B and C. Transistors 206, 212, 220, 222, and 224 form a differential amplifier that inverts the OR function. The positive voltage level required at circuit points B and C to alter the output of the differential amplifier is determined by the voltage applied to the base of transistor 212 by the voltage divider of resistors 216 and 218.

The output of the differential amplifier is taken from the collector of transistor 224 and applied through a resistor 228 to the base of an NPN transistor 230. The emitter of transistor 230 is coupled to ground and the collector is coupled to circuit point D through a resistor 232. A resistor 234 is coupled between circuit point D and positive supply bus 202. Circuit point D is also coupled to ground through capacitor 44 as is shown in FIG. 1. Capacitor 44 is also shown in FIG. 2 for ease of understanding.

The emitter/collector circuit of transistor 230 is alternately made conductive or nonconductive dependent on the output of the differential amplifier. When transistor 230 is nonconductive, capacitor 44 is permitted to charge to approximately the voltage present on positive supply bus 202 through resistor 234. When transistor 230 is conductive, capacitor 44 can charge to only the voltage present at the midpoint of the voltage divider formed by resistors 232 and 234. Resistor 234 performs a current limiting function. In particular, it can be made large enough that even if capacitor 44 were shorted to ground either accidentally or by the firing of a shorted flash lamp, the current therethrough and through the remaining components of the FIG. 2 circuit is below that which would cause damage thereto. Resistor 234 can be made this large because the current for firing the flash lamps is supplied by capacitor 44, not directly from positive supply bus 202. If the current for firing the flash lamps were supplied directly from the positive supply bus 202, resistor 234 could not be made any larger than that value which would limit the current therethrough to a value no less than that required to fire the flash lamps. Since the current required to fire any individual flash lamp may vary widely depending particularly on such variables as manufacturing tolerances and material variations, in order to insure consistent and reliable firing of flash lamps it is desirable to provide a current to fire the flash lamp which is greater than that required for a typical lamp. Thus, were it not for the use of capacitor 44 to supply the lamp firing current, the value of resistor 234 would have to be even further reduced. Additionally, when sufficient light is present that no photoflash is required, transistor 230 becomes conductive and the potential to which capacitor 44 may charge is limited to a value below that of positive supply bus 202, as previously explained, so that the capacitor 44 is not needlessly charged, thus limiting needless battery drain.

It will be observed that as thus far described, the circuit of FIG. 2 differs from that of FIG. 1 in at least one significant respect. In the circuit of FIG. 1, the current flow from the battery directly to the fired flash lamp is limited primarily by the emitter/collector circuit of transistor 38 being nonconductive. In the circuit of FIG. 2, the same current flow is limited primarily by resistor 234. Both, however, use a capacitor discharge to fire the flash lamp and both include means to limit the flow of current from the battery to the lamp being flashed at the time firing the associated gate controlled switching element. It should be further noted that transistor 230 permits capacitor 44 to completely discharge following the closure of switch 30 and thus also performs a function similar to that of transistors 140 and 142 in the embodiment of FIG. 1.

To continue with the description of the circuit of FIG. 2, circuit point D is coupled to the common terminal of the photoflash lamp subarray and, thus, is connected to a first terminal of each of five photoflash lamps 240, 242, 244, 246, and 248. The second terminals of the five photoflash lamps 240, 242, 244, 246, and 248 are coupled to the anodes of silicon controlled rectifier (SCR's) 250, 252, 254, 256, and 258, respectively, the cathodes of each of SCR's 250-258 being coupled to ground. The gate elements of SCR's 250, 252, 254, 256, and 258 are individually coupled to both ground through resistors 260, 262, 264, 266, and 268, respectively, and to the emitters of NPN transistors 270, 272, 274, 276, and 278, respectively. The collectors of transistors 270–278 are coupled to positive supply bus 202. The first four flash lamps 240, 242, 246, and 248 each have a resistor 280, 282, 284, and 286, respectively, in parallel therewith, and a resistor 290, 292, 294, and 296, respectively, coupled from the second terminal thereof to the bases of a PNP transistor 300, 302, 304, and 306, respectively. The collectors of transistors 300, 302, 304, and 306 are coupled to the bases of transistors 272, 274, 276, and 278, respectively, while the emitters of each of transistors 300–306 are coupled to a reference potential bus 307. The bases of transistors 272, 274, 276, and 278 are coupled to the collectors of NPN transistors 312, 314, 316, and 318, respectively. The bases of transistors 312, 314, 316, and 318 are individually coupled to a bus 319 through resistors 322, 324, 326, and 328, respectively, while the emitters of these transistors are each coupled to ground.

An NPN transistor 330 supplies the reference voltage to bus 307. Its emitter is coupled to bus 307 while its collector is coupled to positive supply bus 202. A resistor 332 is coupled between the collector and base of transistor 332 and the series combination of a resistor 340 and two diodes 342 and 344 couple the base thereof to ground, the two diodes being oriented for high positive conductivity toward ground.

Circuit point E is coupled to ground through a resistor 346 and to the base of an NPN transistor 348 through a resistor 350. The collector of transistor 348 is coupled to positive supply bus 202 while the emitter thereof is coupled through a resistor 352 to a circuit point 354 and then, in turn, to ground through a resistor 356. Circuit point 354 is coupled to the base of transistor 270 through a resistor 358. Circuit point D is coupled to the base of a PNP transistor 360, the emitter thereof being coupled through a resistor 362 to positive supply bus 202 and the collector thereof being coupled to bus 319.

After power has been applied to circuit point A and assuming the light level is sufficiently low that transistor 230 is nonconductive, capacitor 44 charges through resistor 234 to approximately the potential of the supply bus 202. The emitter/collector circuit of transistor 360 is then nonconductive because the voltage difference between supply bus 202 and circuit point D is insufficient to forward bias the emitter/base junction thereof. The emitter/collector circuits of transistors 300–306 are also nonconductive as the voltage applied to the bases thereof from circuit point D through the corresponding flash lamp, or the resistor in parallel therewith, and the series base resistor exceeds the voltages applied to the emitter thereof from reference voltage bus 307. Further, the emitter/collector circuits of transistors 312–318 are nonconductive as no positive potential is applied to their bases from bus 319.

When a positive potential pulse is applied to circuit point E a positive pulse is generated in the emitter circuit of transistor 348 and then is applied through transistor 270 to the gate element of SCR 250 firing the SCR. If lamp 240 has not previously been fired or is not otherwise open-circuited, capacitor 44 discharges through lamp 240 and SCR 250 firing the lamp. When the lamp is fired through the SCR, a relatively high voltage drop, on the order of 2.2 volts, appears across the SCR because of the high current passing therethrough and the emitter/base junction of transistor 300 remains reverse biased. Further, the heavy flow of current through lamp 240 and SCR 250 causes the potential at circuit point D to fall significantly below that of supply bus 202 causing the emitter/collector circuit of transistor 360 to become conductive and raising the potential of bus 319 to that of circuit point D. When bus 319 is at a positive potential, transistor 312, as well as transistors 314, 316, and 318, becomes conductive placing the collector of transistor 300, as well as those of transistors 302, 304, and 306 at ground potential. The reverse bias on transistor 300 and the conduction of transistor 360 insure that if lamp 240 is fired, the pulse applied to SCR 250 will not be propagated to any other ones of SCR's 252—252 and none of the other lamps will be fired.

If, however, a positive voltage is applied to circuit point E and lamp 240 has been previously fired or is otherwise open-circuited, SCR 250 will still be fired but the current therethrough will be limited by resistor 280. The voltage drop across SCR 250 will then be less than the potential of reference bus 307 and transistor 300 will be made conductive further making transistor 272 conductive, transistor 360 still being nonconductive since the potential of circuit point D has not dropped significantly below that of supply bus 202. Conduction of transistor 272 fires SCR 252 thus firing flash lamp 242, if it has not been previously fired. If flash lamp 242 has previously been fired, then SCR 254, 256, and 258 are fired sequentially in a manner similar to that just described with respect to SCR 252 until one of the lamps 244, 246, and 248 is fired. Once either of lamps 242, 244, or 246 is fired, the emitter/collector circuit of transistor 360 is made conductive, placing bus 319 at a positive potential and making transistors 312, 314, 316, and 318 conductive as previously described and insuring that when one flash lamp is fired no subsequent lamp will be fired.

The FIG. 2 embodiment also includes circuitry for insuring that no flash lamps are fired after the expiration of a predetermined period following the closure of shutter switch 30. Circuit point 354 is coupled to the collector of an NPN transistor 370 which has its emitter coupled to ground and its base coupled through a resistor 372 to bus 319. The circuit point 354 is also coupled through a resistor 374 to the base of a PNP transistor 376, that transistor having its collector coupled to supply bus 202 and its emitter coupled both to ground through a resistor 378 and to the gate element of an SCR 379. The cathode of SCR 379 is coupled to ground and the anode thereof is coupled through the series combination of a resistor 380 and a diode 382 to supply bus 202. Diode 382 is poled for relatively high positive conductivity away from supply bus 202. The anode of SCR 379 is also coupled to the base of a PNP transistor 384 through a resistor 386, which base is in turn coupled to ground through a capacitor 388. The emitter of transistor 384 is coupled to reference voltage bus 307 and the collector is coupled to the base of an NPN transistor 389 having its emitter coupled to ground and its collector coupled to the base of a PNP transistor 390. The emitter of transistor 390 is coupled to supply bus 202 and the collector thereof is coupled to bus 319.

Prior to the closure of shutter switch 30, capacitor 388 is charged to a sufficient voltage to make transistor 384 nonconductive. Closure of shutter switch 30 causes a pulse to be applied through transistor 376 to the gate of SCR 378 firing the SCR and permitting capacitor 388 to discharge through resistor 386. After a period determined by the time constant of capacitor 388 and resistor 386, the voltage at the base of transistor 384 falls below the potential of bus 307 making that transistor conductive. The potential bus 307 is then coupled to ground through the emitter/collector circuit of transistor 384 and the forward biased emitter/base junction of transistor 389 causing the bus potential to fall toward ground. The reducing of the bus potential further reverse biases the emitter/base junction of transistors 300–306 so that the gates of each of SCR's 252–258 are held at ground potential. Additionally, conduction of transistor 389 causes conduction of transistors 388 and 370, insuring that no positive potential can be applied to the base of transistor 270 and thus holding the gate of SCR 250 at ground potential through resistor 260. The time constant of resistor 386 and capacitor 388 is chosen so that the gates SCR's 250–258 are held at ground potential after the expiration of a period which is relatively long compared to that required for the operation of the sequencing circuit as previously described. Placing the SCR gates at ground potential insures that each one will stop conduction when capacitor 44 is sufficiently discharged so that the SCR current falls below the required holding value. When transistor 390 is conductive, the potential of bus 319 is also raised to approximately that of supply bus 202 thus placing the bases of transistors 272–278 at ground further preventing the application of positive potential to the gates of SCR's 252–258 as previously described. Further, when the potential of bus 319 raises as a result of one of the flash lamps firing, transistor 370 is made conductive insuring that multiple pulses are not applied to the base of transistor 270 as might be caused by contact bounce of shutter switch 30.

The anode of SCR 258 is coupled through a resistor 391 to the base of an NPN transistor 392 having its emitter coupled both to the emitter of an NPN transistor 394 and ground. The collector of transistor 392 is coupled both to the base of transistor 394 and through a resistor 396 to positive supply bus 202. The collector of transistor 394 is coupled to circuit point G and, thus, drives light emitting diode 132. When power is applied to supply bus 202, if flash lamp 248 has not previously been fired, a positive potential will be developed at the anode of SCR 58 causing transistor 392 to be conductive and transistor 394 to be nonconductive so that no current flows through the light emitting diode. If, on the other hand, lamp 248 has been fired and appears as an open circuit, transistor 392 will not be conductive, transistor 394 will be conductive, and current will flow through the light emitting diode. Thus, emission of light from diode 132 after the closure of switch 16 is an indication that the fifth lamp in the array has been previously flashed and a new array should be used.

It will thus be seen that photoflash lamp array sequencing circuits have been provided which fulfill each of the abovementioned objects. It will be obvious that many modifications of the specific embodiments shown may be made without departing from the spirit and scope of this invention. For example, the circuit details of the embodiments shown are subject to wide variation.

While several particular embodiments of this invention are shown above, it will be understood, of course, that the invention is not to be limited thereto since many modifications may be made. It is contemplated, therefore, by the appended claims, to cover any such modifications as fall within the true spirit and scope of this invention.

I claim:

1. A circuit for successively flashing a plurality of N associated photoflash lamps and comprising:
a plurality of N gate controlled switching elements, each of said gate controlled switching elements being arranged for series coupling with a respective one of said N associated photoflash lamps;
a capacitor having two terminals;
circuit means coupled to said capacitor and said gate controlled switching elements for coupling each series combination of said associated photoflash lamps and said gate controlled switching elements between the terminals of said capacitor;
circuit means coupled to said gate controlled switching elements for selectively causing said gate controlled switching elements to be conductive;
a power source for supplying current to and charging said capacitor;
current limiting means coupled to said capacitor and said power source for limiting the flow of current from said power source to said capacitor when one of said gate controlled switching elements is conductive; and
discharge circuit means coupled to said capacitor for discharging said capacitor following the flashing of one of said photoflash lamps.

2. The circuit of claim 1 wherein said current limiting means further limits the flow of current from said power source to said capacitor when one of said gate controlled switching elements is conductive to a value below that required to flash said associated photoflash lamps.

3. A circuit for successively flashing a plurality of N associated photoflash lamps and comprising:
a plurality of N gate controlled switching elements, each of said gate controlled switching elements being arranged for series coupling with a respective one of said N associated photoflash lamps;
a capacitor having two terminals;
circuit means coupled to said capacitor and said gate controlled switching elements for coupling each series combination of said associated photoflash lamps and said gate controlled switching elements between the terminals of said capacitor;
steering circuit means coupled to said gate controlled switching elements for selectively causing said gate controlled switching elements to be conductive;
a power source for supplying current to and charging said capacitor;
current limiting means coupled to said capacitor and said power source for limiting the direct flow of current from said power source to said gate controlled switching elements when one of said gate controlled switching elements is conductive; and
discharge circuit means coupled to said capacitor for discharging said capacitor following the flashing of one of said photoflash lamps.

4. The circuit of claim 3 wherein said current limiting means further limits the direct flow of current from said power source to said gate controlled switching elements when one of said gate controlled switching elements is conductive to a value below that required to flash said associated photoflash lamps.

5. The circuit of claim 3 further comprising:
light responsive means disposed to receive light from a subject to be photographed; and
defeat circuit means coupled to said light responsive means for preventing the flashing of said photoflash lamps when the brightness of the light received by said light responsive means exceeds a predetermined level.

6. The circuit of claim 3 wherein said steering circuit means causes said gate controlled switching elements to be conductive in a predetermined order with the gate controlled switching element associated with the Nth associated photoflash lamp being the last to be made conductive and further comprising:
sensing means for determining the electrical conductivity of said Nth associated photoflash lamp; and
indicator means coupled to said sensing means for indicating whether said Nth associated photoflash lamp has previously been flashed.

7. A circuit for use with an associated photographic apparatus having a shutter mechanism and a first switch which is operated in relation to the cocking of said shutter mechanism and a second switch which is operated in relation to the actuation of said shutter mechanism and a source of electrical current, said circuit successively flashing a plurality of N associated photoflash lamps in response to successive closures of said second switch and comprising:
a plurality of N gate controlled switching elements each of said gate controlled switching elements being arranged for series coupling with a respective one of said N associated photoflash lamps;
a capacitor having two terminals;
circuit means coupled to said capacitor and said gate controlled switching elements for coupling each series combination of said associated photoflash lamps and said gate controlled switching elements between the terminals of said capacitor;
charging circuit means coupled to said source of electrical current, said first switch, and said capacitor for charging said capacitor when said shutter is cocked;
steering circuit means coupled to said second switch and said gate controlled switching elements for selectively causing said gate controlled switching elements to be conductive in response to the operation of said second switch; and
current limiting means coupled to said capacitor and said source of electrical current for limiting the direct flow of current from said source of electrical current to said gate controlled switching elements when one of said gate controlled switching elements is conductive to a value below that required to flash said associated flash lamps.

8. A circuit for flashing a plurality of N associated photoflash lamps in connection with the operation of a photographic apparatus and comprising:

light responsive means disposed to receive light from the subject to be photographed;

circuit means coupled to said photographic apparatus for sequentially flashing said photoflash lamps in response to successive actuations of said photographic apparatus; and flash defeat means coupled to said light responsive means and said circuit means for preventing the flashing of said photoflash lamps when the brightness of the light received by said light responsive means is above a predetermined level.

9. The circuit of claim 8 wherein said circuit means comprises a capacitor and firing circuit means coupled to said capacitor for selectively permitting said capacitor to discharge through said associated photoflash lamps and said flash defeat means is operative to prevent said capacitor from charging above a predetermined voltage when the brightness of the light received by said light responsive means is above a predetermined level.

10. A circuit for flashing a plurality of N associated photoflash lamps in connection with the operation of a photographic apparatus and comprising:

circuit means for sequentially flashing said photoflash lamps in response to successive actuations of said photographic apparatus in a predetermined sequence with the Nth associated photoflash lamp being the last to be fired;

sensing means for coupling to said Nth associated photoflash lamp and determining the electrical conductivity of said Nth associated photoflash lamp; and indicator means coupled to said sensing means for indicating whether said Nth associated photoflash lamp has previously been flashed.

11. The circuit of claim 10 wherein said indicator means further provides a visual indication when said Nth associated photoflash lamp has previously been flashed.

12. The circuit of claim 11 wherein said indicator means comprises a light emitting diode.

13. A circuit for successively flashing a plurality of N associated photoflash lamps and comprising:

a plurality of N gate controlled switching elements, each of said gate controlled switching elements being arranged for series coupling with a respective one of said N associated photoflash lamps;

a capacitor having two terminals;

circuit means coupled to said capacitor and said gate controlled switching elements for coupling each series combination of said gate controlled switching elements and said associated photoflash lamps between the terminals of said capacitor;

steering circuit means coupled to said gate controlled switching elements for selectively causing said gate controlled switching elements to be conductive;

a power source for supplying current to and charging said capacitor;

current limiting means coupled to said capacitor and said power source for limiting the direct flow of current from said power source to said gate controlled switching elements when one of said gate controlled switching elements is conductive;

light responsive means disposed to receive light from a subject to be photographed; and defeat circuit means coupled to said light responsive means for preventing the flashing of said photoflash lamps when the brightness of the light received by said light responsive means exceeds a predetermined level.

14. A circuit for successively flashing a plurality of N associated photoflash lamps in a predetermined order with the Nth assocated photoflash lamp being the last to be flashed and comprising:

a plurality of N gate controlled switching elements, each of said gate controlled switching elements being arranged for series coupling with a respective one of said N associated photoflash lamps;

a capacitor having two terminals;

circuit means coupled to said capacitor and said gate controlled switching elements for coupling each series combination of said gate controlled switching elements and said associated photoflash lamps between the terminals of said capacitor;

steering circuit means coupled to said gate controlled switching elements for selectively causing said gate controlled switching elements to be conductive;

a power source for supplying current to and charging said capacitor;

current limiting means coupled to said capacitor and said power source for limiting the direct flow of current from said power source to said gate controlled switching elements when one of said gate controlled switching elements is conductive;

sensing means coupled to said Nth associated photoflash lamp for determining the electrical conductivity of said Nth associated photoflash lamp; and indicator means coupled to said sensing means for indicating whether said Nth associated photoflash lamp has previously been flashed.

15. A circuit for flashing a plurality of N associated photoflash lamps in connection with the operation of a photographic apparatus and comprising:

circuit means for sequentially flashing said photoflash lamps in response to successive actuations of said photographic apparatus in a predetermined sequence with the Nth associated photoflash lamp being the last to be fired;

sensing means for coupling to said Nth associated photoflash lamp and determining the electrical conductivity of said Nth associated photoflash lamp; and indicator means coupled to said sensing means for indicating whether the conductivity of said Nth associated photoflash lamp is relatively low.

* * * * *